(12) United States Patent
Hasegawa et al.

(10) Patent No.: US 11,738,747 B2
(45) Date of Patent: *Aug. 29, 2023

(54) SERVER DEVICE AND VEHICLE

(71) Applicant: TOYOTA JIDOSHA KABUSHIKI KAISHA, Toyota (JP)

(72) Inventors: Hideo Hasegawa, Nagoya (JP); Keiko Kameda, Toyota (JP); Misa Ejiri, Nagoya (JP); Shintaro Naruse, Nisshin (JP); Tadahiro Kashiwai, Nagoya (JP); Naoya Oka, Toyota (JP); Kensuke Koike, Nisshin (JP); Hiroyuki Monji, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/545,622

(22) Filed: Dec. 8, 2021

(65) Prior Publication Data

US 2022/0097693 A1 Mar. 31, 2022

Related U.S. Application Data

(63) Continuation of application No. 15/929,152, filed on Oct. 9, 2017, now Pat. No. 11,208,100.

(30) Foreign Application Priority Data

Nov. 30, 2018 (JP) .................................. 2018-225418

(51) Int. Cl.
*B60W 30/09* (2012.01)
*B60W 30/095* (2012.01)
(Continued)

(52) U.S. Cl.
CPC ........ *B60W 30/0956* (2013.01); *B60W 10/20* (2013.01); *B60W 30/09* (2013.01);
(Continued)

(58) Field of Classification Search
CPC ........... B60W 10/20; B60W 2050/143; B60W 2050/146; B60W 2554/00;
(Continued)

(56) References Cited

U.S. PATENT DOCUMENTS 9,201,421 B1* 12/2015 Fairfield ................. G06V 20/58
9,754,490 B2* 9/2017 Kentley ............... G05D 1/0088
(Continued)

FOREIGN PATENT DOCUMENTS

JP 2005-242552 A 9/2005
JP 2007-323117 A 12/2007
(Continued)

*Primary Examiner* — Dionne Pendleton
(74) *Attorney, Agent, or Firm* — Oblon, McClelland, Maier & Neustadt, L.L.P.

(57) ABSTRACT

A server device includes: a server communication unit configured to communicate with a vehicle, and receive fallen object avoidance information from the vehicle, the fallen object avoidance information including position information on a fallen object and information indicating whether an avoidance operation was performed by the vehicle for the fallen object; and a server control unit configured to determine, for the same fallen object that is present at the same position, whether the same fallen object should be avoided based on the fallen object avoidance information, and notify a first following vehicle that the same fallen object should be avoided when the server control unit determines that the same fallen object should be avoided, the first following vehicle being a vehicle that is traveling within a predetermined range behind the same fallen object.

6 Claims, 7 Drawing Sheets

(51) Int. Cl.
*H04W 4/46* (2018.01)
*B60W 50/14* (2020.01)
*G07C 5/00* (2006.01)
*G08G 1/0967* (2006.01)
*G08G 1/16* (2006.01)
*B60W 10/20* (2006.01)

(52) U.S. Cl.
CPC .......... *B60W 30/095* (2013.01); *B60W 50/14* (2013.01); *G07C 5/008* (2013.01); *G08G 1/096791* (2013.01); *G08G 1/161* (2013.01); *H04W 4/46* (2018.02); *B60W 2050/143* (2013.01); *B60W 2050/146* (2013.01); *B60W 2554/00* (2020.02); *B60W 2556/65* (2020.02)

(58) Field of Classification Search
CPC ............. B60W 2556/65; B60W 30/09; B60W 30/095; B60W 30/0956; B60W 50/14; G08G 1/0112; G08G 1/096741; G08G 1/096791; G08G 1/161; G08G 1/0967; G08G 1/16; G07C 5/008; G07C 5/00; H04W 4/46
See application file for complete search history.

(56) References Cited

U.S. PATENT DOCUMENTS

| | | | |
|---|---|---|---|
| 9,953,535 B1* | 4/2018 | Canavor | G08G 1/123 |
| 11,161,518 B2* | 11/2021 | Golov | G06V 20/58 |
| 11,208,100 B2* | 12/2021 | Hasegawa | B60W 30/0956 |
| 2005/0063565 A1 | 3/2005 | Nagaok | |
| 2008/0140303 A1 | 6/2008 | Hiruta et al. | |
| 2012/0143489 A1 | 6/2012 | Lee et al. | |
| 2015/0151725 A1 | 6/2015 | Clarke | |
| 2016/0039358 A1* | 2/2016 | Okuda | H04N 25/135 |
| | | | 348/148 |
| 2016/0318490 A1 | 11/2016 | Ben Shalom | |
| 2018/0107946 A1 | 4/2018 | Yamamoto et al. | |
| 2018/0165966 A1 | 6/2018 | Ishikawa et al. | |
| 2020/0004269 A1 | 1/2020 | Oba | |
| 2021/0020045 A1 | 1/2021 | Huang | |
| 2021/0056323 A1 | 2/2021 | Pfeiffer | |
| 2021/0142421 A1 | 5/2021 | Shalev-Shwartz | |

FOREIGN PATENT DOCUMENTS

| | | |
|---|---|---|
| JP | 2008-234044 A | 10/2008 |
| JP | 2017-62583 A | 3/2017 |
| JP | 10 2016 208 883 A1 | 11/2017 |

* cited by examiner

FIG. 3

| POSITION INFORMATION | WHETHER AVOIDANCE OPERATION WAS PERFORMED | DEGREE OF AVOIDANCE OPERATION |
|---|---|---|
| (X1, Y1) | PERFORMED | LOW |
| (X2, Y2) | NOT PERFORMED | Null |
| (X1, Y1) | PERFORMED | HIGH |
| (X3, Y3) | PERFORMED | HIGH |
| (X1, Y1) | PERFORMED | HIGH |
| ... | ... | ... |

FIG. 4

| ID | POSITION INFORMATION | NUMBER OF PERFORMED AVOIDANCE OPERATIONS | NUMBER OF NON-PERFORMED AVOIDANCE OPERATIONS |
|---|---|---|---|
| F1 | (X1, Y1) | 9 | 1 |
| F2 | (X2, Y2) | 0 | 5 |
| F3 | (X3, Y3) | 3 | 1 |
| ... | ... | ... | ... |

000

SERVER DEVICE AND VEHICLE

INCORPORATION BY REFERENCE

This application is a continuation of U.S. application Ser. No. 15/929,152, filed Oct. 9, 2019, the entire contents of which are incorporated herein by reference. U.S. application Ser. No. 15/929,152 claims priority to Japanese Application No. 2018-225418 filed on Nov. 30, 2018 including the specification, drawings and abstract is incorporated herein by reference in its entirety.

BACKGROUND

1. Technical Field

The present disclosure relates to a server device and a vehicle.

2. Description of Related Art

There is an on-vehicle device that captures the image of a road for detecting a fallen object on the road by analyzing the image (for example, Japanese Patent Application Publication No. 2007-323117 (JP 2007-323117 A)). The on-vehicle device described in Japanese Patent Application Publication No. 2007-323117 (JP 2007-323117 A) (related art) sends the information on a fallen object to a roadside device. When the information on the fallen object is acquired from the roadside device, the central management device notifies the vehicles traveling near the fallen object about the information on the fallen object.

SUMMARY

Some fallen objects on a road should be avoided during traveling, while some others need not necessarily be avoided (that is, fallen objects that do not cause any problem when run over), However, in a configuration, such as that of the above-described related art, in which a fallen object is only detected using image analysis, a fallen object that does not need to be avoided may be detected, sometimes with the result that the information on this fallen object is notified to the traveling vehicles. Such a notification, when received by a vehicle, sometimes causes the driver to perform an unnecessary avoidance operation.

The present disclosure provides a server device and a vehicle.

A first aspect of the disclosure provides a server device. The server device according to the first aspect includes: a server communication unit configured to communicate with a vehicle, and receive fallen object avoidance information from the vehicle, the fallen object avoidance information including position information on a fallen object and information indicating whether an avoidance operation was performed by the vehicle for the fallen object; and a server control unit configured to determine, for the same fallen object that is present at the same position, whether the same fallen object should be avoided based on the fallen object avoidance information, and notify a first following vehicle that the same fallen object should be avoided when the server control unit determines that the same fallen object should be avoided, the first following vehicle being a vehicle that is traveling within a predetermined range behind the same fallen object.

A second aspect of the disclosure provides a vehicle. The vehicle according to the second aspect includes: a communication unit configured to communicate with a server device; a capturing device configured to capture a road ahead of the vehicle; and a control unit configured to associate, when the control unit detects from a captured image that a first fallen object is present on a lane in which the vehicle is traveling, position information on the first fallen object with information indicating whether an avoidance operation was performed for the first fallen object, send the associated information to the server device as fallen object avoidance information via the communication unit, and receive a signal from the server device via the communication unit, the signal indicating that a second fallen object should be avoided.

A third aspect of the disclosure provides a vehicle. The vehicle according to the third aspect includes: a communication unit configured to communicate with other vehicles; a capturing device configured to capture a road ahead of the vehicle; and a control unit configured to associate, when the control unit detects from a captured image that a first fallen object is present on a lane in which the vehicle is traveling, position information on the first fallen object with information indicating whether an avoidance operation was performed for the first fallen object, send the associated information to a first vehicle among the other vehicles as first fallen object avoidance information via, the communication unit, determine, when second fallen object avoidance information is received from a second vehicle among the other vehicles, whether a second fallen object should be avoided based on the second fallen object avoidance information, and notify a driver of the vehicle that the second fallen object should be avoided when it is determined that the second fallen object should be avoided.

According to the present disclosure, road traffic safety can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing an example of fallen object avoidance information;

FIG. 4 is a diagram showing an example of information stored in a server storage unit;

DETAILED DESCRIPTION OF EMBODIMENTS

An embodiment of the present disclosure will be described in detail below with reference to the drawings.

Figure 1:
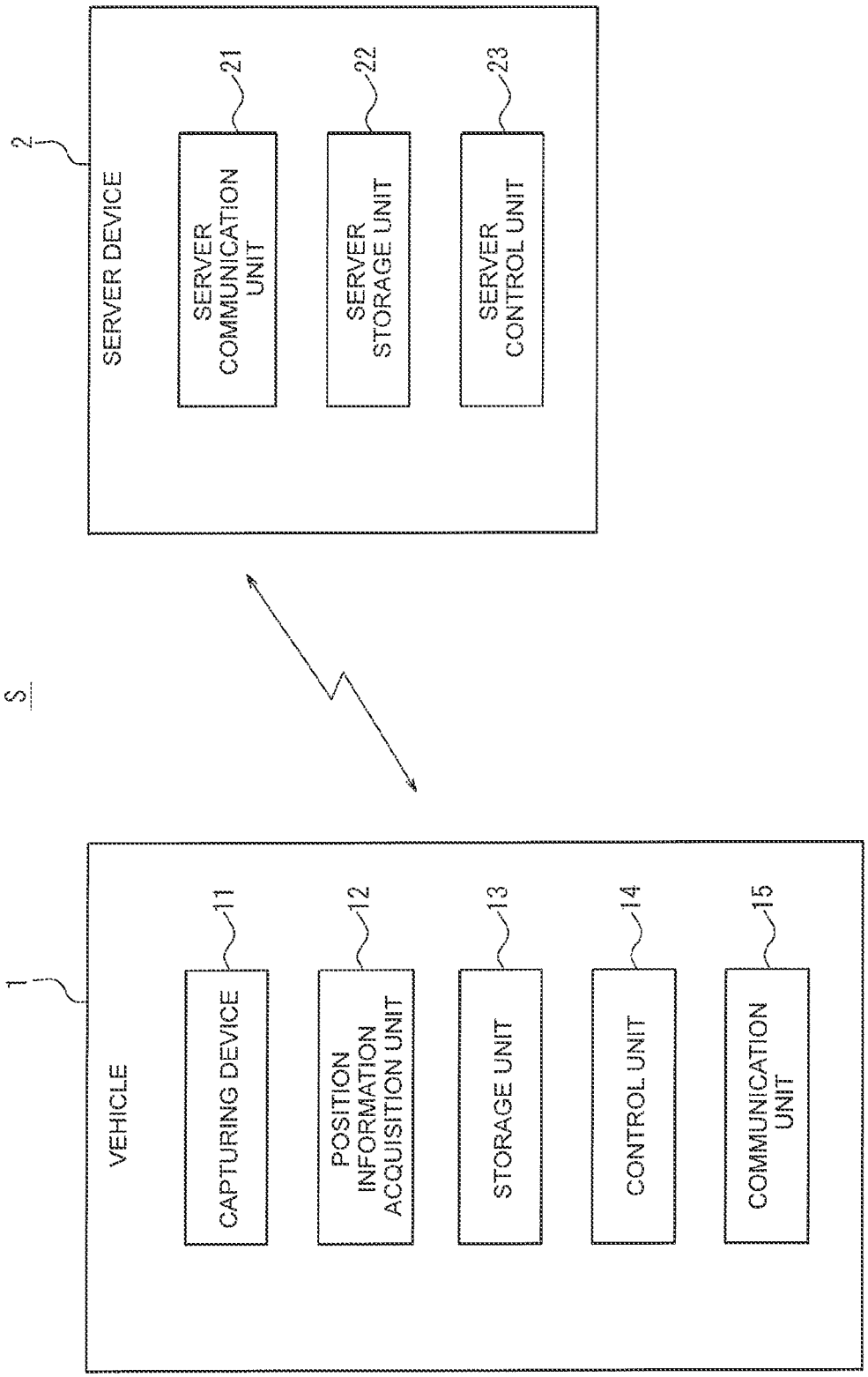
FIG. 1 is a functional block diagram of an information processing system in one embodiment of the present disclosure.

FIG. 1 is an overall view of an example of an information processing system S in this embodiment. The information processing system S includes a vehicle 1 and a server device 2. The vehicle 1 is, for example, an automobile but is not limited to it and may be any vehicle. Although one vehicle 1 and one server device 2 are shown in FIG. 1 for the ease of description, the information processing system S may include one or more vehicles 1 and one or more server devices 2. The vehicle 1 and the server device 2 are configured in such a way that they can communicate with each other via a network such as a mobile communication network or the Internet.

First, an overview of the information processing system S in this embodiment will be described. The vehicle 1 captures the road ahead of the vehicle 1. When it is detected from the captured image that there is a fallen object on the lane in which the vehicle 1 is traveling, the vehicle 1 associates the position information on the fallen object with the information indicating whether the avoidance operation was performed for the fallen object. The vehicle 1 sends the associated information to the server device 2 as fallen object avoidance information. When the fallen object avoidance information is received, the server device 2 determines whether to avoid the fallen object based on the fallen object avoidance information. When it is determined that the fallen object should be avoided, the server device 2 sends a signal to the following vehicle, which is traveling within the predetermined range behind the fallen object, to notify that the fallen object should be avoided.

Thus, when determining whether to avoid a fallen object, the server device 2 in this embodiment uses the information indicating whether the vehicle 1 actually performed the avoidance operation. Using this information makes it possible to determine more accurately whether the fallen object should be avoided. Therefore, the server device 2 can reduce the output of an incorrect message that prompts the following vehicle to avoid a fallen object that need not be avoided, improving road traffic safety (for example, accidents are reduced). In addition, the information on a fallen object that should avoided is provided to the government. This makes it possible to quickly remove the fallen object.

Returning to FIG. 1, the internal configuration of each of the vehicle 1 and the server device 2 will be described below in detail.

The vehicle 1 includes a capturing device 11, a position information acquisition unit 12, a storage unit 13, a control unit 14, and a communication unit 15.

The capturing device 11 includes the so-called on-vehicle camera that captures the image of the road ahead of the vehicle 1 (outside of the vehicle 1). The capturing device 11 may generate the continuous image of the road ahead of the vehicle 1 is while the vehicle 1 is moving or stationary and record the generated image in the storage unit 13. Nate that instead of the on-vehicle camera, any communication terminal such as a smartphone may function as the capturing device 11.

The position information acquisition unit 12 includes one or more receivers corresponding to any satellite positioning system. For example, the position information acquisition unit 12 may include a global positioning system (GPS) receiver. The position information acquisition unit 12 detects the position information that indicates the position at which the vehicle 1 is stopped or traveling. The position information acquisition unit 12 may further include an electronic compass for acquiring the information on the direction in which the vehicle 1 is pointing.

The storage unit 13, in which various types of information are recorded and stored, includes one or more memories. The "memory" includes, but is not limited to, a semiconductor memory, a magnetic memory, or an optical memory. Each memory included in the storage unit 13 may function as, for example, a main storage device, an auxiliary storage device, or a cache memory. The storage unit 13 stores any information related to the operation of the vehicle 1. The storage unit 13 may store the information on results produced by analysis and processing by the control unit 14. The storage unit 13 may store the vehicle control program of the host vehicle and various types of information related to the operation or control of the vehicle 1.

The control unit 14 includes one or more processors. The "processor" may be a general purpose processor or a dedicated processor specialized for specific processing. For example, an electronic control unit (ECU) mounted on the vehicle 1 may function as the control unit 14. The control unit 14 controls the overall operation of the vehicle 1. For example, the control unit 14 controls the capturing device 11, the position information acquisition unit 12, the storage unit 13 and the communication unit 15 and, at the same time, controls all the operations related to the traveling and operation of the vehicle 1. For example, the control unit 14 can analyze an image captured by the capturing device 11 and, as a result of the analysis, detect a fallen object.

The communication unit 15 includes a communication module that performs communication between the vehicle 1 and the server device 2, The communication unit 15 may include, as necessary, a communication module that performs inter-vehicle communication between the vehicle 1 and another vehicle not via the server device 2. The communication unit 15 may include a communication module for connection to the network or a communication module conforming to mobile communication standards such as the 4th generation (4G) and the 5th generation (5G). For example, an on-vehicle communication device mounted on the vehicle 1, such as the data communication module (DCM), may function as the communication unit 15.

The server device 2 includes a server communication unit 21, a server storage unit 22, and a server control unit 23.

The server communication unit 21 includes a communication module for communication between the server device 2 and the vehicle 1 or for communication between the server device 2 and a client (public office system, etc.). The server communication unit 21 may include a communication module for connection to the network. The server communication unit 21 can receive information sent from the vehicle 1 and, at the same time, can send information or instructions to the vehicle 1. The server communication unit 21 may receive, for example, the position information on a fallen object and the fallen object avoidance information from the vehicle 1. When there are a plurality of the vehicles 1, the server communication unit 21 may receive the position information on a fallen object and the fallen object avoidance information from the plurality of the vehicles 1.

The server storage unit 22, in which various types of information are recorded and stored, includes one or more memories. The "memory" includes, but is not limited to, a semiconductor memory, a magnetic memory, or an optical memory. Each memory included in the server storage unit 22 may function, for example, as a main storage device, an auxiliary storage device, or a cache memory. The server storage unit 22 stores, for example, the information sent from the vehicle 1 (fallen object avoidance information, captured image, etc.). The server storage unit 22 may store the server control program or various programs related to the overall operation and control of the is information processing system S.

The server control unit 23 includes one or more processors. The "processor" may be a general purpose processor or a dedicated processor specialized for specific processing.

The server control unit 23 controls the server communication unit 21 and the server storage unit 22. At the same time, the server control unit 23 performs all the control operations for the overall operations of the server device 2 and the information processing system S. For example, the server control unit 23 can analyze the information obtained from the vehicle 1 (e.g., fallen object avoidance information) and, as a result of this analysis, determine whether to avoid a fallen object.

Figure 2:
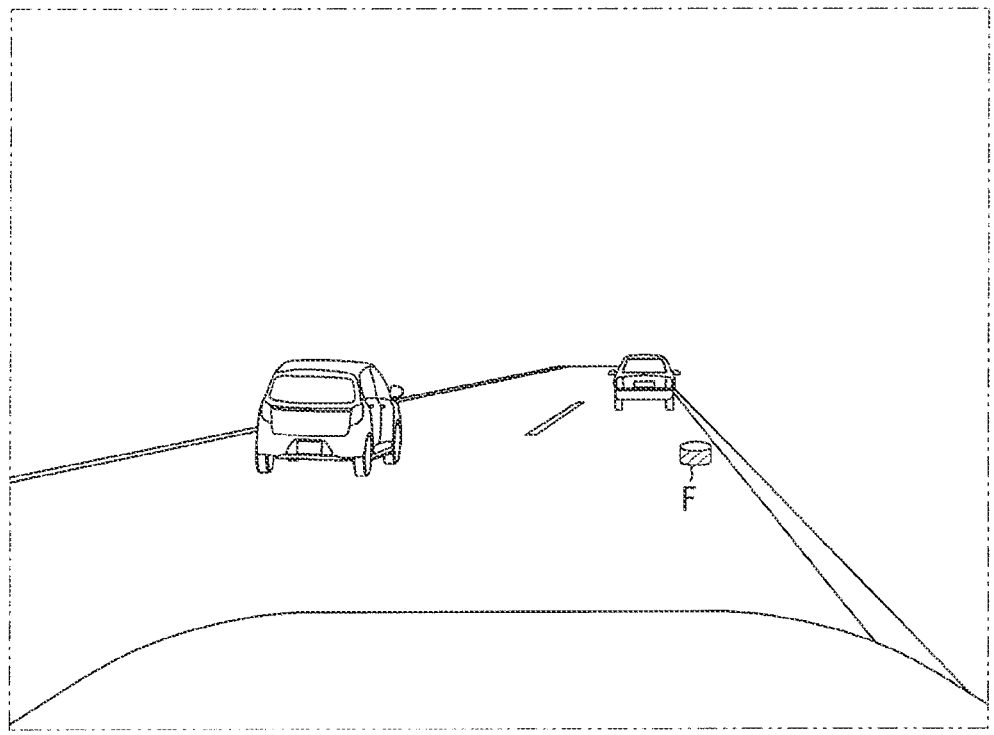
FIG. 2 is a diagram showing a situation in which a vehicle detects a fallen object on a lane using a captured image.

The processing performed by the vehicle 1 and the server device 2 will be described in detail below. The vehicle 1 uses the capturing device 11 to capture the image of the road ahead of the vehicle 1. From the captured image, the vehicle 1 detects a fallen object F (see FIG. 2) on the lane, in which the vehicle 1 travels, by any object detection method. When a fallen object F is detected, the vehicle 1 determines the relative positional relationship between the vehicle 1 and the fallen object F from the captured image. Then, from the relative positional relationship determined as described above and the position information on the vehicle 1 acquired by the position information acquisition unit 12, the vehicle 1 determines the position of the fallen object F. Note that instead of determining the position of the fallen object F as described above, the vehicle 1 may also determine the position of the vehicle 1 itself as the position of the fallen object F.

After detecting the fallen object F, the vehicle 1 determines, via the control unit 14, whether the vehicle 1 performed the avoidance operation for the fallen object F. Whether the avoidance operation was performed may be determined based on whether at least one of the steering operation and the brake operation was performed.

The vehicle 1 establishes an association among the following three: (1) the position information on the fallen object F, (2) the information indicating whether the avoidance operation was performed for the fallen object F, and (3) the degree of the avoidance operation (for example, high, low, etc.) for the fallen object. The vehicle 1 sends the information, associated as described above, to the server device 2 as the fallen object avoidance information. The information on the degree of the avoidance operation is optional. FIG. 3 shows several examples of the fallen object avoidance information. The avoidance operation whose "Degree of avoidance operation" in FIG. 3 is "High" may include the sudden steering operation and the sudden braking operation. The sudden steering operation corresponds, for example, to a steering operation in which the "lateral acceleration is 0.25 G or more" or the "yaw angular velocity is 8.5 deg./s or more". The sudden braking operation corresponds, for example, to a braking operation in which the "longitudinal acceleration is −0.25 G or less". The vehicle 1 may send the image captured by the capturing device 11, together with the fallen object avoidance information, to the server device 2.

There may be a plurality of the vehicles 1. Each of the plurality of the vehicle 1 sends the fallen object avoidance information such as the one described above.

The server device 2 receives the fallen object avoidance information from the plurality of the vehicles 1 and stores the received information in the server storage unit 22 as shown in FIG. 4. More specifically, the server device 2 assigns an ID to each fallen object F, in assigning an ID, the server device 2 determines that two or more fallen objects F having the same position information are the same fallen object and assigns the same ID to those fallen objects. For each fallen object F to which the same ID is assigned, the server device 2 counts and stores the number of times the avoidance operation was performed (This corresponds to "Number of performed avoidance operations" in FIG. 4. The same applies hereinafter) and the number of times the avoidance operation was not performed (This corresponds to "Number of non-performed avoidance operations" in FIG. 4. The same applies hereinafter). Note that instead of using the counting method described above, the server device 2 may add L not to "Number of performed avoidance operations", but to "Number of non-performed avoidance operations" when the avoidance operation was performed but its degree is low (that is, when "Degree of avoidance operation" in FIG. 3 is "Low"). That is, the server control unit may determine whether to avoid a fallen object based further on the degree of the avoidance operation.

Note that instead of assigning the same ID as described above, the same ID may also be assigned to a plurality of fallen objects as follows. That is, based on the position information included in the fallen object avoidance information, the server device 2 determines whether there is a plurality of fallen objects within a predetermined distance. The predetermined distance is, for example, 3 meters, but any distance may be used. In addition, the server device 2 identifies, through image analysis, the types of the plurality of fallen objects that have been detected within the predetermined distance (for example, tires, falling stones, cardboards, plastic bags, cargo, etc.) and, based on result of this image analysis, determines whether there is a plurality of fallen objects of the same type. When there is a plurality of fallen objects that belong to the same type, the server device 2 may determine that those fallen objects are the same fallen object and assign the same ID to them.

For the same fallen object, the server device 2 calculates the ratio of the number of the vehicles 1 that performed the avoidance operation to the total number of the vehicles 1 that performed the avoidance operation and the vehicles 1 that did not perform the avoidance operation. When it is determined that the calculated ratio is equal to or greater than a predetermined value, the server device 2 determines that the fallen object should be avoided. For example, for the fallen object F with the ID of F1 shown in FIG. 4, the server device 2 determines whether the ratio of the number of performed avoidance operations (9) to the total number (10) of performed avoidance operations (9) and non-performed avoidance operations (1) (that is, 90%) is more than a predetermined value.

The server device 2 determines that a fallen object F having the ratio equal to or higher than a predetermined value is a fallen object that should be avoided. The predetermined value is, for example, 80%. When the predetermined value is 80%, the server device 2 determines that the fallen object F with the ID of F1, shown in FIG. 4, is a fallen object that should be avoided. Note that the predetermined value need not always be 80% but may be any other value. The processing to determine whether a fallen object that should be avoided may be performed by the server control unit 23.

Figure 5:
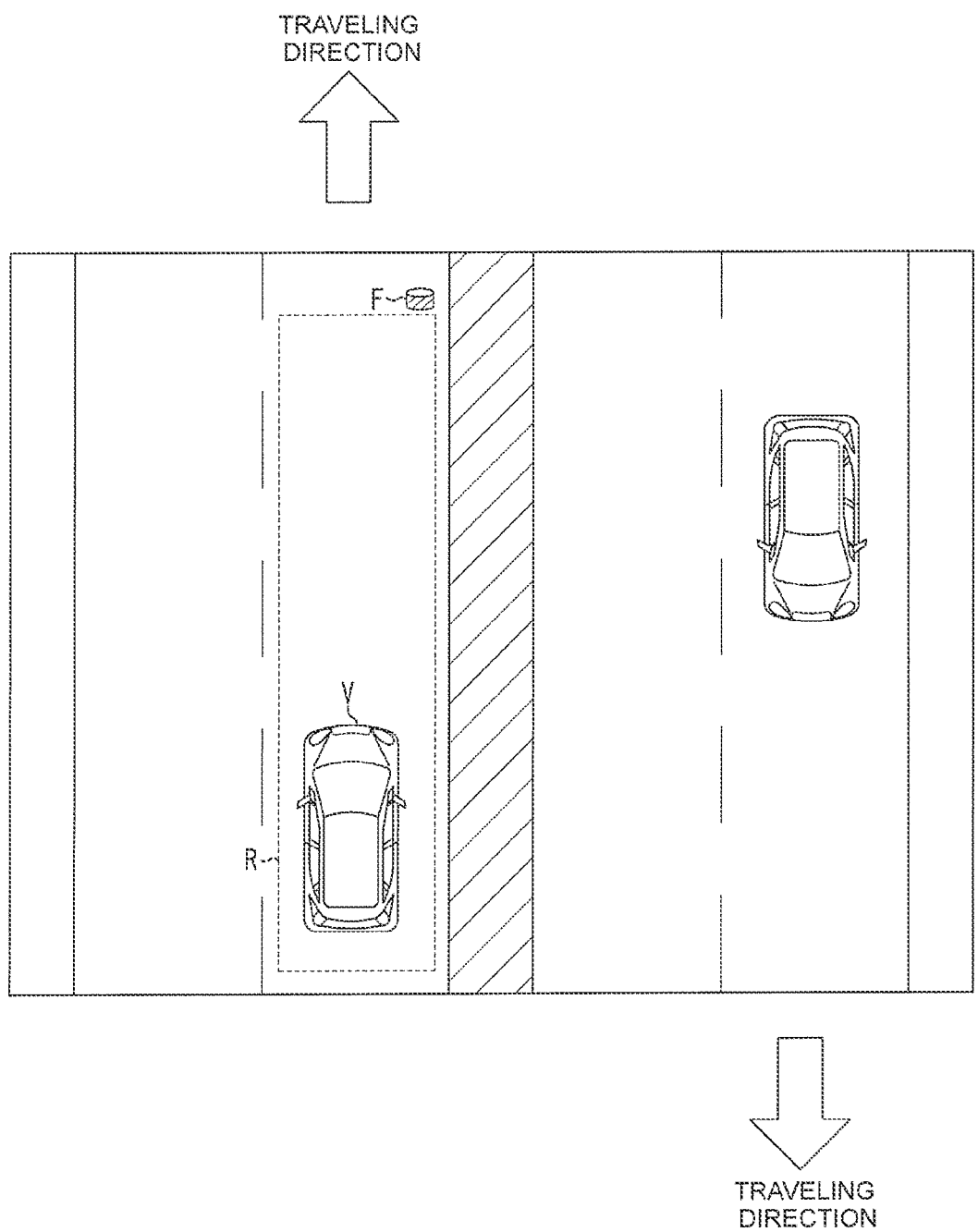
FIG. 5 is a diagram showing a situation in which a vehicle notifies the following vehicle of a fallen object that should be avoided.

When a fallen object F that should be avoided is detected, the server device 2 detects a following vehicle V, which is traveling in a predetermined range R behind the fallen object F (see FIG. 5), by referring to the position information obtained from the vehicles traveling on each road. The following vehicle that is traveling in a predetermined range behind the fallen object may be a vehicle that is traveling toward the fallen object ahead in the same lane and is within a predetermined distance behind the fallen object as shown in FIG. 5. Note that instead of a vehicle that is traveling in the same lane, the following vehicle that is traveling in the predetermined range behind the fallen object may also be a vehicle that is traveling in one of the lanes of the road and is within a predetermined distance behind the fallen object.

When a following vehicle traveling in a predetermined range behind the fallen object is detected, the server device 2 notifies the following vehicle of the position information on the fallen object that should be avoided and of the information indicating that the fallen object should be avoided. The processing to notify the following vehicle may be performed by the server control unit 23.

Figure 6:
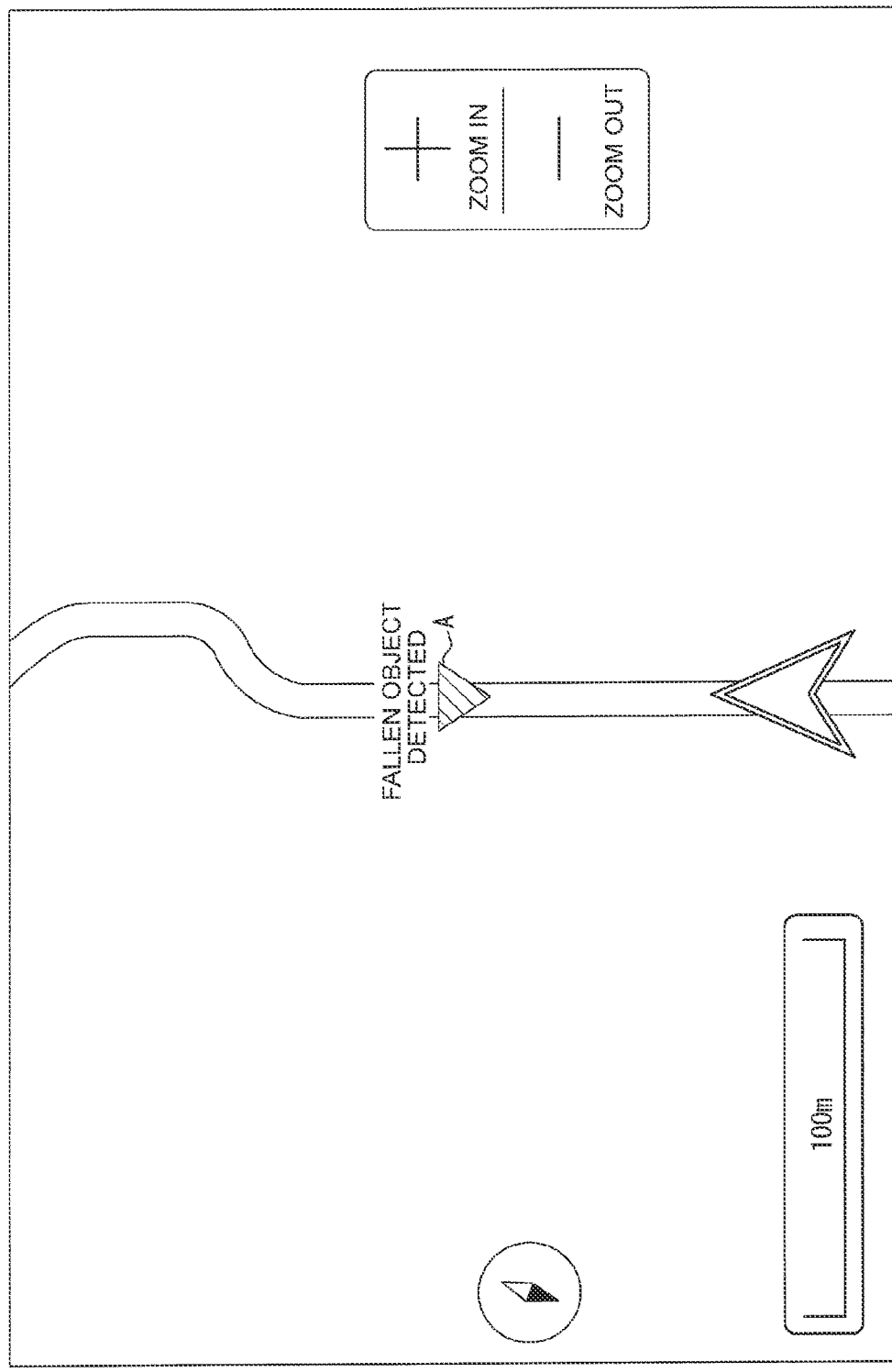
FIG. 6 is a diagram showing an example of a screen for notifying about a fallen object.

The following vehicle, which has received the notification, may output a voice message or a screen display to notify the driver that there is a fallen object in the lane in which the vehicle is traveling. The screen display includes, for example, a display on the screen of the navigation system or a display on the head-up display. Note that instead of the voice message or the screen display described above, the following vehicle may determine the position of a fallen object from the position information received from the server device 2 and display a warning A, such as that shown in FIG. 6, on the display unit. For example, as shown in FIG. 6, the warning A includes, but is not limited to, the information on the position of the fallen object and a message indicating there is the fallen object that should be avoided. The warning A may further include, for example, a message prompting the avoidance operation, the image of the fallen object, or the type of the fallen object. To prevent driver's distraction, the following vehicle may display a summarized or shortened display message on the display unit.

The following vehicle, when autonomous, may be steered autonomously to avoid a fallen object that should be avoided.

In addition to the function described above, the server device 2 may have is another function. That is, the server device 2 determines, for each of a plurality of adjacent lanes extending in the same direction, whether there is a fallen object that should be avoided. The processing to determine whether there is such a fallen object may be performed by the server control unit 23. The server device 2 may notify the following vehicle traveling in the one of the other lanes about a lane that is one of the plurality of lanes and has the smallest number of fallen objects that should be avoided. The processing to notify the following vehicle about such a lane may be performed by the server control unit 23. The following vehicle, when autonomous, may be steered autonomously to travel in a lane with the least number of fallen objects that should be avoided.

After notifying the following vehicle that there is a fallen object that should be avoided, the server device 2 may determine whether there is still the fallen object that should be avoided by using an image that another following vehicle has captured at the same position where the fallen object was detected. When it is determined that there is no more the fallen object that should be avoided, the server device 2 may send a notification, which indicates that there is no more the fallen object, to a vehicle that has been notified that the fallen object should be avoided. The processing to send the notification to a vehicle, which has been notified that the fallen object should be avoided, may be performed by the server control unit 23.

Figure 7:
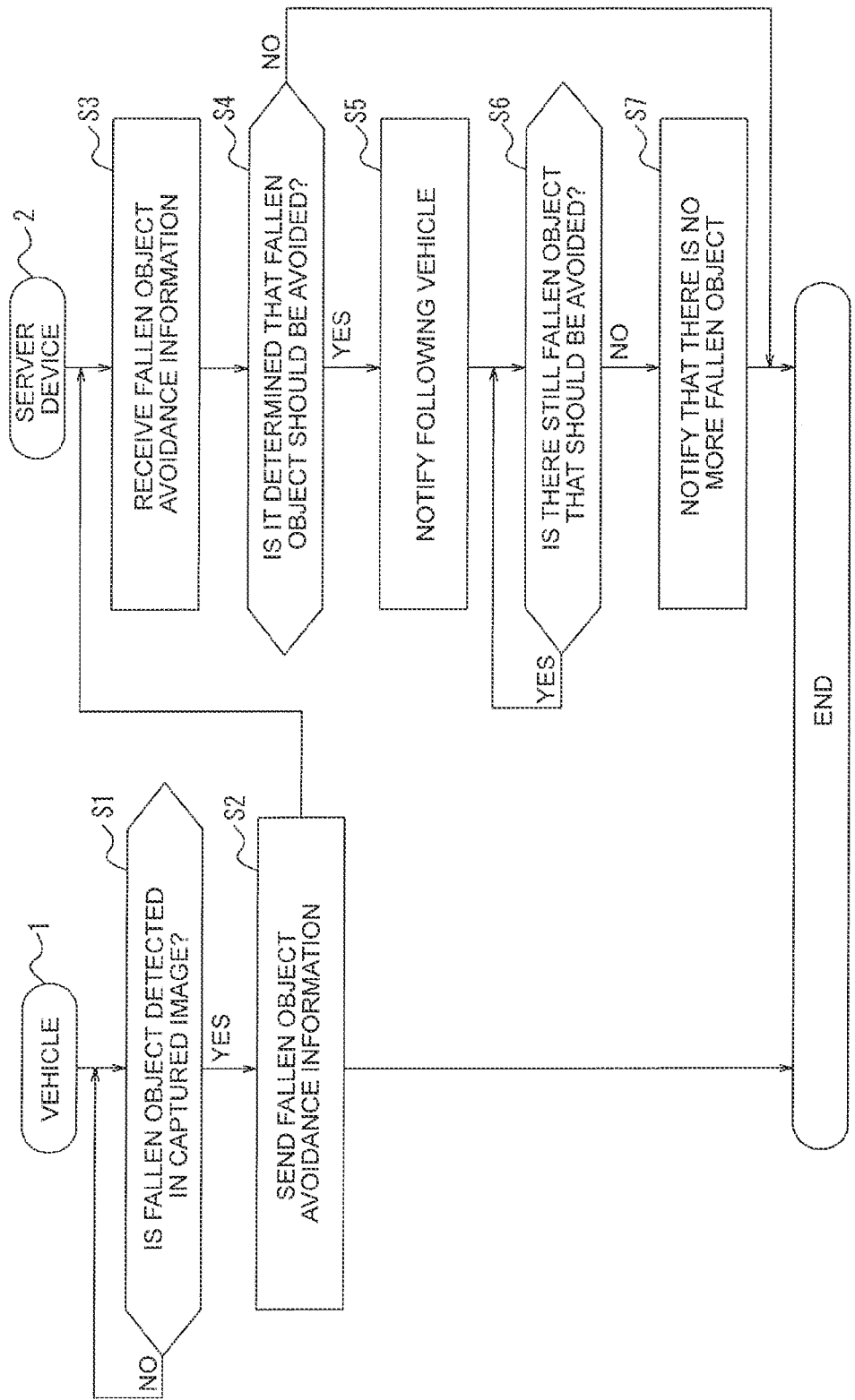
FIG. 7 is a sequence diagram of processing executed by the information processing system in this embodiment.

FIG. 7 shows a sequence diagram of the operation performed at an arbitrary time by the information processing system S in this embodiment.

Step S1: The vehicle 1 determines whether a fallen object is detected from the captured image of the road ahead of the vehicle 1.

Step S2: When a fallen object is detected from the captured image (Yes in step S1), the vehicle 1 associates the position information on the fallen object with the information indicating whether the avoidance operation was performed by the vehicle 1 for the fallen object. The vehicle 1 sends the associated information to the server device 2 as the fallen object avoidance information.

Step S3: The server device 2 receives the fallen object avoidance information from the vehicle 1.

Step S4: The server device 2 determines, based on the fallen object avoidance information, whether the same fallen object that is present at the same position should be avoided. The description of the determination method, which has been described above, is omitted here.

Step S5: When it is determined that the fallen object should be avoided (Yes in step S4), the server device 2 notifies the following vehicle, which is traveling within a predetermined range behind the fallen object, that the fallen object should be avoided.

Step S6: After notifying that there is the fallen object that should be avoided, the server device 2 determines whether there is still the fallen object.

Step S7: When it is determined that there is no more the fallen object (No in step S6), the server device 2 notifies a vehicle, which has been notified that the fallen object should be avoided, that there is no more the fallen object.

As described above, when determining whether to avoid a fallen object, the server device 2 in this embodiment uses the information indicating whether the vehicle 1 actually performed the avoidance operation. Using this information makes it possible to determine more accurately whether the fallen object should be avoided. Therefore, the server device 2 can reduce the output of an incorrect message that prompts the following vehicle to avoid a fallen object that need not be avoided, improving road traffic safety. In addition, the information on a fallen object that should avoided is provided to the government. This makes it possible to quickly remove the fallen object.

In addition, the server device 2 in this embodiment calculates the ratio of the number of the vehicles 1 that performed the avoidance operation to the total number of the vehicles 1 that performed the avoidance operation and the vehicles 1 that did not perform the avoidance operation. When it is determined that the calculated ratio is equal to or greater than a predetermined value, the server device 2 determines that the fallen object should be avoided. This allows the server device 2 to statistically determine whether the avoidance operation is necessary, making it possible to determine whether to is avoid more accurately.

For each of a plurality of adjacent lanes in the same direction, the server device 2 in this embodiment determines whether there is a fallen object that should be avoided. Based on this determination, the server device 2 notifies the following vehicle of a lane that is one of the plurality of lanes and has the smallest number of fallen objects that should be avoided. That is, the server device 2 notifies the following vehicle of a lane with the smallest number of fallen objects that should be avoided and is therefore relatively safe. This notification guides the following vehicle to a lane that is relatively safe, further improving road traffic safety.

When a first fallen object and a second fallen object are present within a predetermined distance and they belong to the same type, the server device 2 in this embodiment determines that the first fallen object and the second fallen object are the same fallen object. The processing to determine that the first fallen object and the second fallen object are the same fallen object may be performed by the server control unit 23. Therefore, even if the first fallen object (for example, a plastic bag) is moved to another position when touched by a traveling vehicle or blown away by wind and, as a result, the first fallen object is detected as the second fallen object that is seemingly different from the first fallen object, the server device 2 determines that these two fallen objects are the same fallen object. Based on this determination, the server device 2 combines the two pieces of fallen object avoidance information, one for the first fallen object and the other for the second fallen object, into one. The fallen object avoidance information, generated correctly in this way, allows the server device 2 to determine more accurately as to whether to avoid a fallen object.

After it is determined that a fallen object should be avoided, the server device 2 in this embodiment determines whether there is still the fallen object that should be avoided, using an image that the following vehicle 1 has captured at the same position where the fallen object was detected. The processing to determine whether there is still the fallen object may be performed by the server control unit 23. When it is determined that there is no more the fallen object that should be avoided, the server control unit 23 sends a notification, which indicates that there is no more the fallen object, to a vehicle that has been notified that the fallen object should be avoided. That is, when a notification was once sent to the following vehicle to indicate that there was a fallen object that should be avoided but the fallen object is no more present, the server device 2 notifies the following vehicle of this condition. Such a notification eliminates the need for the driver of the following vehicle, who was once notified of the presence of the fallen object and is not yet aware that the fallen object is no more present, to perform unnecessary avoidance operations that might otherwise be performed. Thus, the server device 2 can further improve road traffic safety.

Although the present disclosure has been described with reference to the drawings and embodiments, it should be noted that those skilled in the art can easily make various changes and modifications based on the present disclosure. Therefore, it is to be noted that these changes and modifications are within the scope of the present disclosure. For example, it is possible to relocate the functions included in each unit or each step in such a way that they are not logically contradictory, and it is possible to combine a plurality of units or steps into one or to divide a plurality of units or steps.

For example, in the embodiment described above, the vehicle 1 sends the fallen object avoidance information to the server device 2. However, in another embodiment, the vehicle 1 may send the fallen object avoidance information to another vehicle, communicably connected to the vehicle 1, not via the server device 2. Another vehicle may be, for example, a following vehicle that is traveling within a predetermined range behind the fallen object such as the vehicle described in the above-mentioned embodiment. When the fallen object avoidance information is received from another preceding vehicle, the vehicle 1 may add its own fallen object avoidance information, generated by the vehicle 1, to the received fallen object avoidance information and, then, send the resulting fallen object avoidance information to the following vehicle. In this way, the fallen object avoidance information may be accumulated each time it is sent to the following vehicle. In addition to the function described above, the vehicle 1 may have another function. That is, when the fallen object avoidance information is received from is another preceding vehicle, the vehicle 1 may determine whether to avoid the fallen object in the same way as the server device 2 determines whether to avoid the fallen object in the embodiment described above. When it is determined that the fallen object should be avoided, the vehicle 1 may notify the following vehicle's driver that the fallen object should be avoided. This notification may be output as a voice message or a screen display via the communication terminal of the following vehicle's driver or may be output as a voice message or a screen display via the terminal provided in the following vehicle. In this embodiment, the control unit 14 may be configured, when it is detected from the captured image that a fallen object is present on the lane in which the vehicle is traveling, to associate position information on the fallen object with information indicating whether an avoidance operation was performed for the fallen object and to send the associated information to another vehicle as the fallen object avoidance information via the communication unit. The control unit 14 may also be configured, when the fallen object avoidance information is received from another vehicle, to determine whether the fallen object should be avoided based on the fallen object avoidance information and, when it is determined that the fallen object should be avoided, to notify a driver of the vehicle that the fallen object should be avoided.

In the embodiment described above, the server device 2 notifies the following vehicle of the position information on a fallen object that should be avoided and the information indicating that the fallen object should be avoided and then, the following vehicle, which has received this notification, notifies the driver of the presence of the fallen object via a voice message or a screen display. In another embodiment, the server device 2 notifies the following vehicle of the position information on a fallen object that should be avoided and the information indicating that the fallen object should be avoided and then, not the following vehicle, but the server device 2 may notify the communication terminal of the following vehicle's driver of the presence of the fallen object via a voice message or a screen display.

In the embodiment described above, the server device 2 detects the types of a plurality of fallen objects that are present within the predetermined distance through image analysis and, based on the result of the image analysis, determines whether the types of the plurality of fallen objects are the same. In another embodiment, not the server device 2 but the control unit 14 of the vehicle 1 may analyze the image captured by the capturing device 11 and, based on the result of the analysis, determine whether the types of a plurality of fallen objects are the same. In this case, the fallen object avoidance information, sent from the vehicle 1 to the server device 2, includes the information on the type.

A configuration is also possible in which any vehicle functions as the vehicle 1 in the embodiment described above. More specifically, a program describing the processing for implementing the functions of the vehicle 1 in this embodiment is stored in the memory of any vehicle so that the program is read for execution by the processor of the vehicle. Similarly, a configuration is also possible in which a general-purpose information processing device, such as a computer, functions as the server device 2 in the embodiment described above. Therefore, the disclosure according to this embodiment may also be implemented as a program that can be executed by a processor.

The control unit 14 may be configured, when it is detected from a captured image that a fallen object is present on the lane in which the vehicle is traveling, to associate position information on the fallen object with information indicating whether an avoidance operation was performed for the fallen object and to send the associated information to the server as fallen object avoidance information via the communication unit. The control unit 14 may also be configured to receive a signal, which indicates that the fallen object should be avoided, from the server via the communication unit.

Also, the present disclosure may be realized with the embodiments described below.

One aspect of the present disclosure may provide a server control method performed by a server device configured to communicate with a vehicle via a server communication unit. The server control method may include: receiving fallen object avoidance information from the vehicle, the fallen object avoidance information including position information on a fallen object and information indicating whether an avoidance operation was performed by the vehicle for the fallen object determining, for the same fallen object that is present at the same position, whether the fallen object should be avoided based on the fallen object avoidance information; and notifying a following vehicle that the fallen object should be avoided when it is determined that the fallen object should be avoided, the following vehicle being a vehicle that is traveling within a predetermined range behind the fallen object.

Another aspect of the present disclosure may provide a non-transitory storage medium storing a server control program for execution on a server device configured to communicate with a vehicle via a server communication unit. The server control program may cause the server device to execute: receiving fallen object avoidance information from the vehicle, the fallen object avoidance information including position information on a fallen object and information indicating whether an avoidance operation was performed by the vehicle for the fallen object; determining, for the same fallen object that is present at the same position, whether the fallen object should be avoided based on the fallen object avoidance information; and notifying a following vehicle that the, fallen object should be avoided when it is determined that the fallen object should be avoided, the following vehicle being a vehicle that is traveling within a predetermined range behind the fallen object.

Another aspect of the present disclosure may provide a vehicle control method performed by a vehicle. The vehicle may include a capturing device, a communication unit, and a control unit. The vehicle may be configured to communicate with another vehicle via the communication unit. The vehicle control method may include: capturing a road ahead of the vehicle using the capturing device; when it is detected from a captured image that a fallen object is present on a lane in which the vehicle is traveling, associating position information on the fallen object with information indicating whether an avoidance operation was performed for the fallen object and sending the associated information to another vehicle as fallen object avoidance information via the communication unit; and when fallen object avoidance information is received from another vehicle, determining whether a fallen object should be avoided based on the fallen object avoidance information and, when it is determined that the fallen object should be avoided, notifying a driver of the vehicle that the fallen object should be avoided.

Another aspect of the present disclosure may provide a non-transitory storage medium storing a vehicle control program for execution on a vehicle. The vehicle may include a capturing device, a communication unit, and a control unit. The vehicle may be configured to communicate with another vehicle via, the communication unit. The vehicle control program may cause the vehicle to execute: capturing a road ahead of the vehicle using the capturing device; when it is detected from a captured image that a fallen object is present on a lane in which the vehicle is traveling, associating position information on the fallen object with information indicating whether an avoidance operation was performed for the fallen object and sending the associated information to another vehicle as fallen object avoidance information via the communication unit; and when fallen object avoidance information is received from another vehicle, determining whether a fallen object should be avoided based on the fallen object avoidance information and, when it is determined that the fallen object should be avoided, notifying a driver of the vehicle that the fallen object should be avoided.

What is claimed is:

1. A vehicle comprising:
    a communication circuitry configured to communicate with a server device;
    a camera configured to capture a road ahead of the vehicle; and
    a control circuitry configured to:
        associate, when the control circuitry detects from a captured image that a first fallen object is present on a lane in which the vehicle is traveling, position information on the first fallen object with information indicating whether an avoidance operation was performed for the first fallen object,
        send the associated information to the server device as fallen object avoidance information via the communication circuitry, and
        receive a signal from the server device via the communication circuitry, the signal indicating that a second fallen object should be avoided,
    wherein a server control circuitry of the server device is configured to determine that the first fallen object should be avoided when the server control circuitry determines that a ratio of the number of vehicles that performed the avoidance operation for the first fallen object to the total number of: i) vehicles that performed the avoidance operation for the first fallen object; and ii) vehicles that did not perform the avoidance operation for the first fallen object, is equal to or greater than a predetermined value.

2. The vehicle according to claim 1, wherein
whether the avoidance operation was performed is determined based on at least one of a steering operation and a braking operation.

3. The vehicle according to claim 1, wherein
the server control circuitry of the server device is further configured to
    determine, for each of a plurality of adjacent lanes extending in a same direction, whether there is a fallen object that should be avoided on each of the plurality of adjacent lanes, and
    notify a second following vehicle of a lane that is one of the plurality of adjacent lanes and that has a smallest number of fallen objects that should be avoided.

4. The vehicle according to claim 1, wherein
the server control circuitry of the server device is configured to determine that the first fallen object and the second fallen object are a same fallen object when the first fallen object and the second fallen object are present within a predetermined distance and belong to a same type.

5. The vehicle according to claim 1, wherein
the server control circuitry of the server device is configured to determine, after the server control circuitry determines that the fallen object is a target fallen object that should be avoided, whether there is still the target fallen object by using an image that a third following vehicle has captured at the same position where the target fallen object was present, and when it is determined that there is no more the target fallen object that should be avoided, send a notification to a vehicle that has been notified that the target fallen object should be avoided, the notification indicating that there is no more the target fallen object.

6. The vehicle according to claim 1, wherein the fallen object avoidance information further includes a degree of the avoidance operation, and the server control circuitry of the server device is configured to determine whether to avoid the fallen object based further on the degree.

\* \* \* \* \*